US009462032B2

(12) United States Patent
Lieber

(10) Patent No.: US 9,462,032 B2
(45) Date of Patent: Oct. 4, 2016

(54) STREAMING MEDIA CONTENT

(71) Applicant: Google Inc., Mountain View, CA (US)

(72) Inventor: Zeev Lieber, Toronto (CA)

(73) Assignee: Google Inc., Mountain View, CA (US)

(*) Notice: Subject to any disclaimer, the term of this patent is extended or adjusted under 35 U.S.C. 154(b) by 265 days.

(21) Appl. No.: 13/950,022

(22) Filed: Jul. 24, 2013

(65) Prior Publication Data

US 2015/0032851 A1 Jan. 29, 2015

(51) Int. Cl.
G06F 15/16 (2006.01)
H04L 29/06 (2006.01)

(52) U.S. Cl.
CPC .......... *H04L 65/608* (2013.01); *H04L 65/602* (2013.01)

(58) Field of Classification Search
CPC . H04L 65/4084; H04L 65/602; H04L 65/80; H04L 29/06027; H04L 47/10
See application file for complete search history.

(56) References Cited

U.S. PATENT DOCUMENTS

| 7,047,308 | B2 | 5/2006 | Deshpande |
| 7,464,172 | B2 | 12/2008 | Deshpande |
| 8,190,674 | B2 | 5/2012 | Narayanan et al. |
| 8,219,711 | B2 | 7/2012 | Visharam et al. |
| 8,396,983 | B1 | 3/2013 | Inskip et al. |
| 8,458,753 | B2 | 6/2013 | Hasek et al. |
| 2003/0061371 | A1 | 3/2003 | Deshpande |
| 2004/0179476 | A1* | 9/2004 | Kim .................. H04L 12/40143 370/230 |
| 2004/0264489 | A1 | 12/2004 | Klemets et al. |
| 2005/0018651 | A1* | 1/2005 | Yan et al. ...................... 370/352 |
| 2005/0262261 | A1 | 11/2005 | Deshpande |
| 2006/0080454 | A1* | 4/2006 | Li ................................ 709/231 |
| 2008/0181221 | A1 | 7/2008 | Kampmann et al. |
| 2008/0186849 | A1 | 8/2008 | Kampmann et al. |
| 2009/0150557 | A1 | 6/2009 | Wormley et al. |
| 2009/0259766 | A1 | 10/2009 | Karlsson et al. |
| 2009/0285282 | A1 | 11/2009 | Amir et al. |
| 2010/0235542 | A1 | 9/2010 | Visharam et al. |

(Continued)

FOREIGN PATENT DOCUMENTS

| CN | 101156388 A | 4/2008 |
| CN | 101160848 A | 4/2008 |
| EP | 1872536 A1 | 1/2008 |
| EP | 1872537 A1 | 1/2008 |

(Continued)

OTHER PUBLICATIONS

International Search Report and Written Opinion for related Application No. PCT/US2014/018302 dated Jul. 24, 2014.

Primary Examiner — Umar Cheema
Assistant Examiner — Gregory P Tolchinsky
(74) Attorney, Agent, or Firm — Honigman Miller Schwartz and Cohn LLP

(57) ABSTRACT

A method for serving a media stream to a client device includes transmitting a media stream encoded at a first bitrate to a client device and receiving one or more control messages from the client device. Each control message indicates a player state of a media player of the client device at a time corresponding to the control message and a buffer state of a buffer of the client device at the time. The method includes determining a server state of a server, indicating a network bandwidth available to the server. The method includes determining a second bitrate for the media stream based on the player state, the buffer state, and the network bandwidth available to the server. The method further includes instructing a transcoder to encode the media content at the second bitrate to obtain an adjusted media stream and transmitting the adjusted media stream to the client device.

16 Claims, 7 Drawing Sheets

(56) References Cited

U.S. PATENT DOCUMENTS

| | | |
|---|---|---|
| 2011/0093605 A1* | 4/2011 | Choudhury et al. .......... 709/231 |
| 2011/0296046 A1 | 12/2011 | Arya et al. |
| 2012/0311177 A1 | 12/2012 | Visharam et al. |
| 2012/0324122 A1 | 12/2012 | Miles et al. |
| 2013/0044801 A1 | 2/2013 | Cote et al. |
| 2013/0097220 A1 | 4/2013 | Lyons et al. |
| 2013/0298170 A1* | 11/2013 | ElArabawy ....... H04W 28/0231 725/62 |

FOREIGN PATENT DOCUMENTS

| | | |
|---|---|---|
| JP | 04681044 B2 | 5/2011 |
| JP | 04819873 B2 | 11/2011 |
| KR | 2005047920 | 5/2005 |
| KR | 2008114343 | 12/2008 |
| KR | 2010086178 | 7/2010 |
| RU | 2389145 C2 | 5/2010 |
| WO | WO-2006108434 A1 | 10/2006 |
| WO | WO-2006108435 | 10/2006 |
| WO | WO-2010085043 A2 | 7/2010 |

* cited by examiner

STREAMING MEDIA CONTENT

TECHNICAL FIELD

This disclosure relates to streaming media content, and in particular, techniques for controlling a streaming session from the server of the media content.

BACKGROUND

Currently, hypertext transfer protocol (HTTP) Live Streaming ("HLS") is a popular media streaming protocol. According to the HLS protocol, a media stream is divided into a sequence of HTTP-based file downloads, or "chunks." One feature of HLS is that the client can select the bitrate of the media stream from a plurality of predefined bitrates. The media file to be downloaded may be pre-encoded at the variable bitrates and stored at a server, such that upon the client selecting a particular bitrate, the server serving the media stream begins to serve chunks of the media stream encoded at the selected bitrate. One issue with HLS is that the client assumes a certain model of how the server operates and is in charge of determining the bitrate for the media stream. Furthermore, the client assumes that the server has all the pieces of the stream pre-encoded and split in each of the variable bitrates.

SUMMARY

One aspect of the disclosure provides a method for serving a media stream to a client device. The method includes transmitting a media stream encoded at a first bitrate to a client device and receiving one or more control messages from the client device. Each control message indicates a player state of a media player of the client device at a time corresponding to the control message and a buffer state of a buffer of the client device at the time. The method further includes determining a server state of a server. The server state at least indicates a network bandwidth available to the server. The method includes determining a second bitrate for the media stream based on the player state, the buffer state, and the network bandwidth available to the server. The method further includes instructing a transcoder to encode the media content at the second bitrate to obtain an adjusted media stream and transmitting the adjusted media stream to the client device.

Implementations of the disclosure may include one or more of the following features. In some implementations, the player state indicates whether the media player is operating in a play mode or a pause mode. The buffer state indicates an amount of media content stored in the buffer at the time and a value indicating a proportion of the buffer that is full or empty at the time. Additionally or alternatively, the method may include storing a plurality of media content files, including the media content file, in a non transitory storage device.

The method may include determining the second bitrate. In some examples, determining the second bitrate includes determining whether the buffer is depleting and when the buffer is depleting, adjusting the second bitrate such that the second bitrate is less than the first bitrate. Additionally or alternatively, determining the second bitrate may include determining whether the media buffer is full or approximately full, and when the media buffer is full or approximately full, setting the second bitrate approximately equal to the network bandwidth. In some examples, determining the second bitrate includes determining whether the network bandwidth is greater than a speed of the transcoder and whether the media buffer is filling, and when the network bandwidth is greater than the speed of the transcoder and when the media buffer is filling, adjusting the second bitrate such that the second bitrate is greater than the first bitrate.

In some implementations, the method includes communicating a heartbeat message to the client device at a predetermined interval. The client device uses the heartbeat message to ensure that a session between the server and the client device remains operable. Additionally or alternatively, the method may further include storing a portion of the media stream in a cache. The portion of the media stream corresponds to a portion of the media stream being sent to the client device. The method may include determining that the second bitrate is performed by a server.

Another aspect of the disclosure provides a server for serving a media stream to a client device. The server includes a transcoder operable to encode a media content file from a first format to a second format at a plurality of different bitrates. The server further includes a network interface device operable to transmit a media stream encoded at a first bitrate to a client device over a network and a processing device executing a stream manager. The stream manager is configured to receive one or more control messages from the client device. Each control message indicates a player state of a media player of the client device at a time corresponding to the control message and a buffer state of a buffer of the client device at the time. The stream manager is configured to determine a server state of the server. The server state at least indicates a network bandwidth available to the server. The stream manager is further configured to determine a second bitrate for the media stream based on the player state, the buffer state, and the network bandwidth available to the server. The stream manager instructs the transcoder to encode the media content at the second bitrate to obtain an adjusted media stream and transmits the adjusted media stream to the client device via the network interface device.

In some implementations, the player state indicates whether the media player is operating in a play mode or a pause mode. The buffer state indicates an amount of media content stored in the buffer at the time and a value indicating a proportion of the buffer that is full or empty at the time. Additionally or alternatively, the server may include a storage device for storing a plurality of media content files, including the media content file.

The stream manager may determine the second bitrate. In some examples, the stream manager determines the second bitrate by determining whether the buffer is depleting, and when the buffer is depleting the stream manager adjusts the second bitrate such that the second bitrate is less than the first bitrate. Additionally or alternatively, the stream manager may determine the second bitrate by determining whether the buffer is full or approximately full. When the media buffer is full or approximately full, the stream manager sets the second bitrate approximately equal to the network bandwidth. In some examples, the stream manager determines the second bitrate, by determining whether the network bandwidth is greater than a speed of the transcoder and whether the media buffer is filling. When the network bandwidth is greater than the speed of the transcoder and when the media buffer is filling, the stream manager adjusts the second bitrate such that the second bitrate is greater than the first bitrate.

In some implementations, the stream manager is further configured to communicate a heartbeat message to the client device at a predetermined interval. The client device uses the heartbeat message to ensure that a session between the server and the client device remains operable. Additionally or alternatively, the server further includes a stream cache that stores a portion of the media stream in a cache. The portion of the media stream corresponds to a portion of the media stream being sent to the client device.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
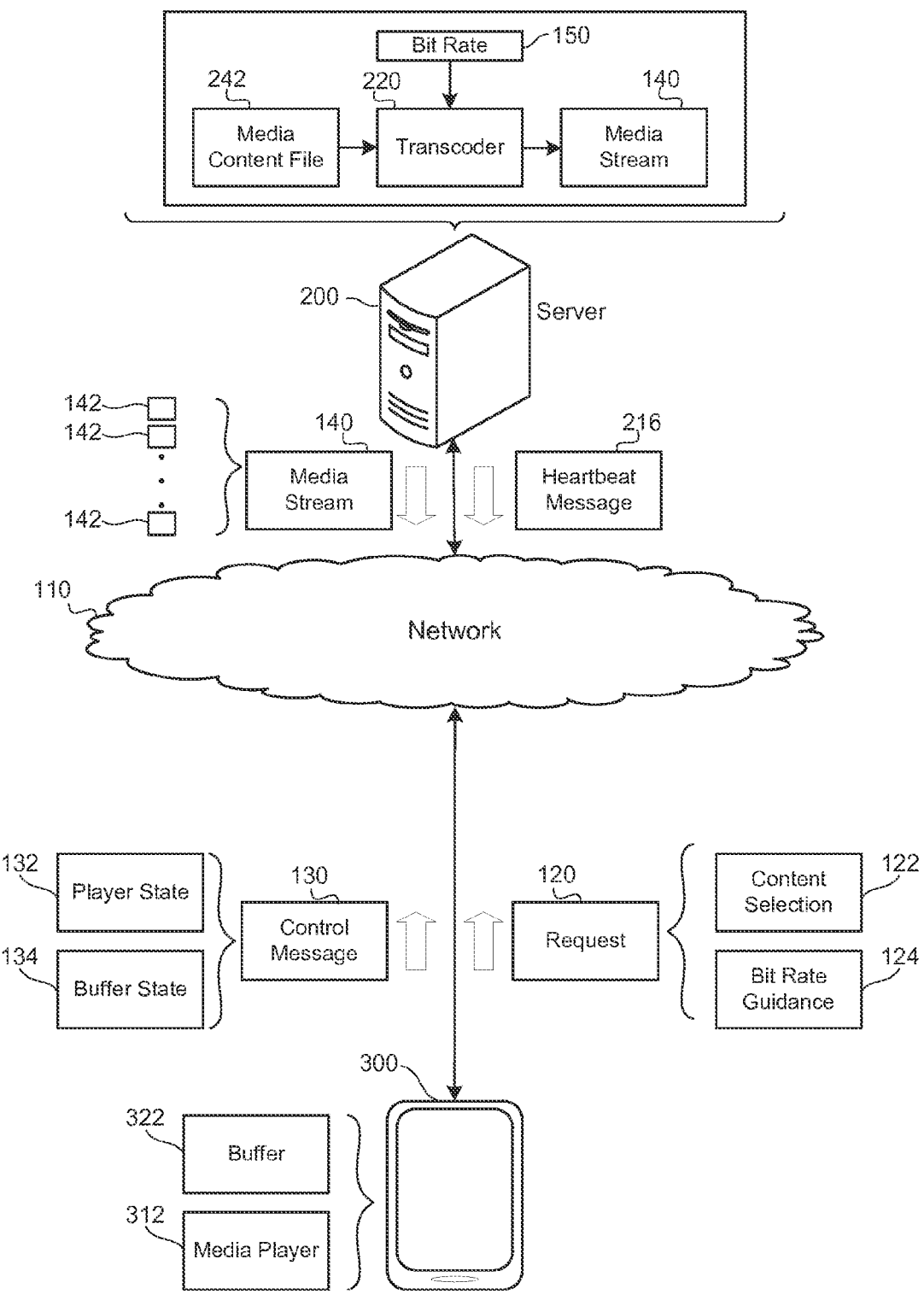
FIG. 1 is schematic illustrating an example environment for transmitting a media stream from a server to a client.

FIG. 1 illustrates an example environment for serving a media stream 140 to a client computing device 300 (herein referred to as a "client") from a server 200. A media stream 140 can include, for example, video data and/or audio data. In some implementations, the server 200 receives a request 120 from the client 300. The request 120 can include a content selection 122 and a bitrate guidance 124. The server 200 can initiate a session with the client 300, whereby data such as subsequent messages and chunks 142 of the media stream 140 are communicated over the session. The server 200 can retrieve a media content file 242 corresponding to the content selection 122 and can transcode the media content file 242 using a transcoder 220. The server 200 configures the transcoder 220 to transcode the media content file 242 at a specified bitrate 150. Initially, the server 200 can set the bitrate 150 to a default bitrate 150, determine the bitrate 150 based on one or more parameters, or can use a bitrate 150 indicated in the request 120 by the bitrate guidance 124. The transcoder 220 outputs a media stream 140 encoded at the bitrate 150, which the server 200 transmits to the client 300 via a network 110. While receiving the media stream 140, the client 300 periodically transmits control messages 130 to the server 200, the control messages 130 indicating a player state 132 and a buffer state 134 of the client 300 at a time corresponding to the generation of the control message 130. The server 200 can adjust the bitrate 150 of the media stream 140 based on the player state 132, the buffer state 134, and a server state which can define an available bandwidth of the network 110 and/or a speed of the transcoder 220. In this way, the server 200 determines an appropriate bandwidth for the media stream 140.

During the transmission of the media stream 140, the server 200 can also transmit heartbeat messages 160 to the client 300, which the client 300 monitors to ensure that a media streaming session has not been interrupted. In particular, certain situations may arise where the server 200 momentarily pauses transmission of the media stream 140. For example, if the buffer 322 of the client 300 is full and the media player 312 is paused, then the server 200 can cease transmission of the media stream 140 until it receives a control message 130 indicating that the media player 312 has recommenced playback of the media stream 140. During such a period, the server 200 may keep the streaming session open. The heartbeat messages 160 transmitted to the client 300 notify the client 300 that the streaming session with the server 200 is still intact, despite the client 300 not receiving any additional portions of the media stream 140 for a prolonged period of time, e.g., more than two seconds. If the client 300 does not receive a heartbeat message 160 for a prolonged period of time, e.g., more than two seconds, the client 300 can end the current session and initiate a new session.

In some implementations, the server 200 and client 300 are configured to communicate using an HTTP-based protocol, e.g., HTTP/1.1. In these implementations, the requests 120 generated by the client 300 can be HTTP requests. In response to receiving the request 120, the server 200 can create a session in the form of an HTTP connection, which represents a playback stretch. The server 200 can assign a session ID to the HTTP connection, such that subsequent communications can identify the particular HTTP connection or session. In these implementations, the client 300 initiates playback by sending an HTTP GET request to the server 200. The media content file 242 to stream is identified in the request path. The protocol version may be set to HTTP/1.1. The HTTP request may further include a transfer encoding field, which indicates the transfer encoding that the client is willing to accept. For example, the transfer encoding may be set to "x-chunked-live," "chunked-live," or "chunked." The following is an example of an HTTP request:

```
GET     /path-to-stream.ts HTTP/1.1\r\n
TE:chunked-live\r\n
X-Streaming-SessionID: 1234567890\r\n
...(other fields)... \r\n\
\r\n
```

In this example, the client 300 has requested a stream of a file located at "path-to-stream.ts" over the HTTP connection 1234567890 encoded using "chunked-live" encoding techniques. Moreover, in this example, the server 200 had previously established an HTTP connection. The foregoing is an example of a request 120 and is not intended to be limiting. Variations of the request are contemplated. For example, the request 120 may exclude the TE field. In such a scenario, the server 200 may fall back into a default transfer encoding, e.g., chunked encoding.

In some scenarios, the request 120 may be provided without a session ID. For example, if the server 200 has not yet established an HTTP connection, the request 120 may be without a session ID. The following is an example of such an HTTP request:

```
GET     /path-to-stream.ts HTTP/1.1\r\n
TE:chunked-live\r\n
X-Bitrate-Guidance: 2500\r\n
...(other fields)... \r\n\
\r\n
```

In this example, the client 300 has requested a stream of a file located at "path-to-stream.ts" and to be initially delivered at 2500 kbps. In some implementations, the client 300 can transmit requests 120 to continue a media stream 140, e.g., when the media stream 140 is interrupted.

In addition to specifying the path of the media content file 242 to be streamed, the client 300 may also specify a location within the stream 140, e.g., a byte or frame offset, at which to begin streaming the media stream 140. In such a scenario, the client 300 may include a HTTP range header. The server 200 may be constrained to support ranges of the form <start>, i.e., from a certain point, byte, or frame in the file until the end of the file). If the range is specified in frames or bytes, then the request 120 can include a session ID, as the server 200 maintains a buffer of recently sent data. If the requested range is found within the server's buffer, the server 200 can commence streaming at the point indicated in the range. The following is an example of a request to reconnect an existing session at a byte offset of 12345678:

```
GET     /path-to-stream.ts HTTP/1.1\r\n
TE:chunked-live\r\n
X-Strearning-SessionID: dsv/3498dDei0ed03d\r\n
Range: bytes=12345678\r\n
\r\n
```

In this example, the client 300 has requested that the media file 242 located at "path-to-stream.ts" be streamed using session dsv/3498dDei0ed03d beginning at byte 12345678.

In some implementations, the request 120 may include a time offset represented in, for example, milliseconds instead of a byte or frame offset. In this scenario, a session ID may be excluded from the request 120. The following is an example of a request 120 to seek to one minute into the media stream and to begin a new session:

```
GET     /path-to-stream.ts HTTP/1.1\r\n
TE:chunked-live\r\n
Range: milliseconds=60000\r\n
\r\n
```

In this example, the client 300 has requested that the media file 242 located at "path-to-stream.ts" be streamed starting 60000 milliseconds, i.e., one minute, at an initial bitrate 150 of 2500 kbps.

In response to a request 120, e.g., a GET message, the server 200 can respond with a response message that includes the same value in the transfer-encoding field. The server 200 may also provide a valid streaming session ID in the X-Streaming-Session' header. The following is an example of a valid response message:

```
HTTP 200 OK\r\n
Transfer-Encoding: chunked-live\r\n
X-Streaming-SessionID:1234567890\r\n
\r\n
```

The foregoing is an example of a response to a GET message and is not intended to limit the scope of the disclosure.

Upon receiving a request 120, the server 200 can retrieve the media file 242 located at the indicated location and the transcoder 220 can begin encoding the media stream 140 at an initial bitrate 150. The initial bitrate 150 may be indicated by the client 300 in the bitrate guidance 124 or may be determined by the server 200. Furthermore, all or portions of the media file 242 may be encoded at varying bitrates ahead of time and stored. The server 200 transmits the media stream 140 to the client 300. During transmission, the client 300 sends control messages 130 to the server 200, which can include a player state 132 and/or a buffer state 134. The player state 132 can indicate a state of the media player 312. In some implementations, the player state 132 indicates whether the media player 312 is operating in a "play mode" or a "pause mode" at the time the control message 130 is generated. The buffer state 134 can indicate a state of the buffer 322 at the time the control message 130 is generated. In some implementations, the buffer state 134 can contain a data parameter indicating an amount of the media stream 140 (in, for example, bytes) stored in the buffer 322 and/or a filled parameter indicating a percentage of the buffer 322 that is full (or empty). The buffer state 134 may include additional or alternate parameters as well, such as a rate of change of the buffer 322 and/or an amount of time required to fill the buffer 322. The client 300 can be configured to communicate the control messages 130 at predetermined time intervals, e.g., every second, and/or whenever the player state 132 changes.

In some implementations, the control messages 130 are provided by sending HTTP requests over the HTTP connection, e.g., using HTTP pipelining. In these implementations, control messages 130 can access specific uniform resource locators (URLs), e.g., "/pause," "/resume," and/or "/buffer?data=####&filled=###." The data field can be an integer representing the amount of bytes in the buffer 322, while the filled field can be a percentage indicating the proportion of the buffer 322 that is full (or empty).

Upon receiving the control message 130, the server 200 can determine whether to adjust the bitrate 150 of the media stream 140. The server 200 also monitors its server state, which may also be used to determine the bitrate 150. For instance, the server 200 can monitor the amount of time waiting for the transcoder for a kB of data, $T_t$. The server 200 can also monitor the amount of time waiting to send a kB of data over the network 110, $T_n$. The server 200 can also monitor a speed of the network 110, $R_n$, can be expressed in an amount of data sent per second. The foregoing parameter is more meaningful when the network is the bottleneck, i.e., $T_n \gg T_t$. The server 200 can further monitor the current bitrate 150 of the media stream 140, $R_p$. Based on one or more of server state parameters, the buffer state 134 of the client 300, and/or the player state 132, the server 200 determines an adjusted bitrate 150 for the media stream 140. Upon determining the adjusted bitrate 150, the server 200 configures the transcoder 220 to begin encoding the media stream 140 at the adjusted bitrate 150.

Figure 2:
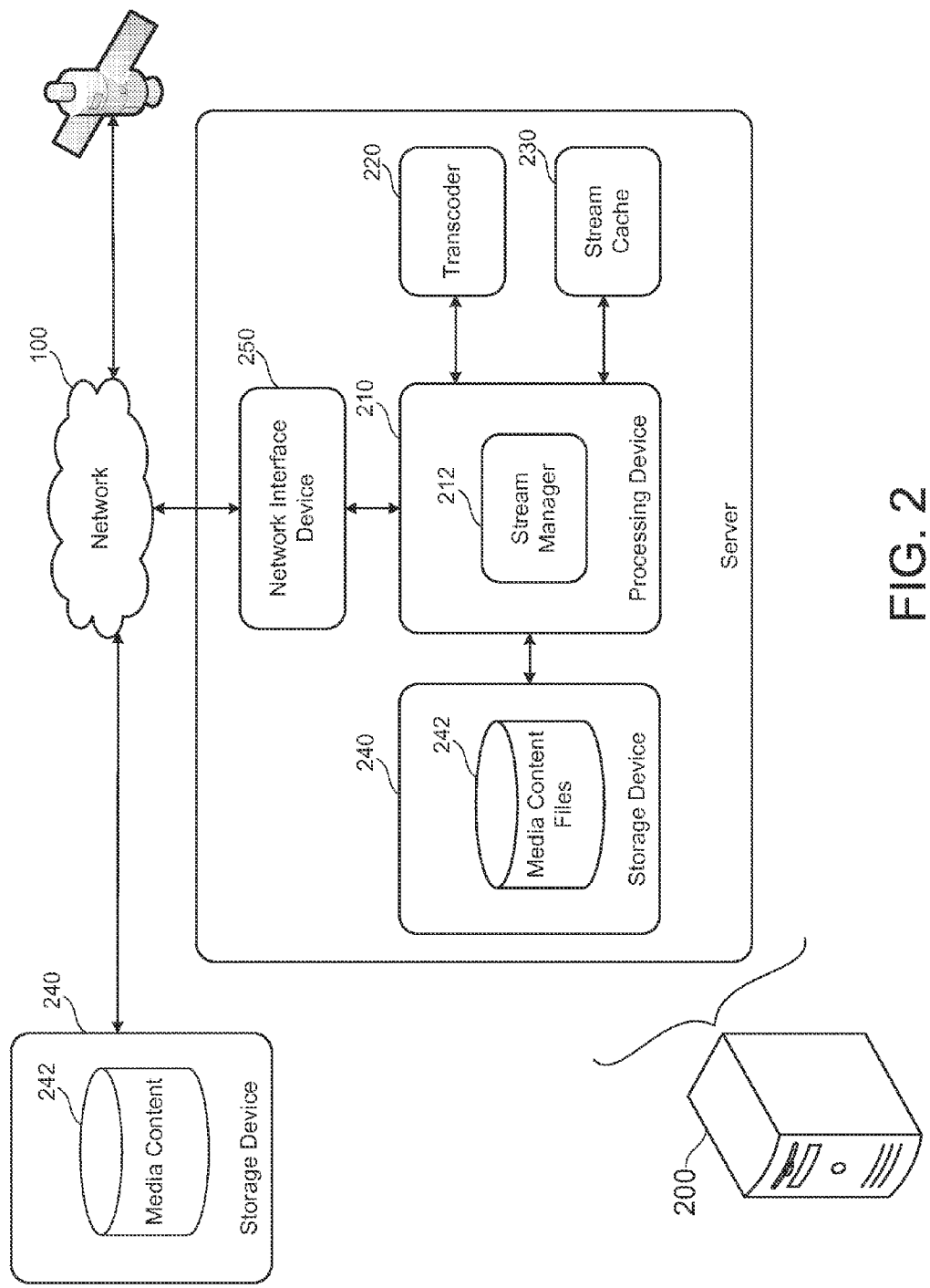
FIG. 2 is a schematic illustrating an example server configured to transcode and transmit a media stream to a client.

FIG. 2 illustrates an example of a server 200. The server 200 can include a processing device 210 executing a stream manager 212, a transcoder 220, a stream cache 230, and a storage device 240 storing the media content files 242. Additionally or alternatively, the storage device 240 may be located at a remote location, such that the server 200 access the media content files 242 via the network 110. The components of the server 200 depicted in FIG. 2 are provided for example and not intended to limit the scope.

The processing device 210 includes non-transitory computer readable memory (e.g., RAM and/or ROM) and one or more processors that execute computer-readable instructions. In implementations where the processing device 210 includes two or more processors, the processors can execute in an individual or distributed manner. Furthermore, the processors may be located at different physical locations. The processing device 210 executes the stream manager 212 (discussed further below), which can be embodied as computer readable instructions.

The transcoder 220 converts the media content files from a first encoding format to a second encoding format. For example, if the media content files 242 are video files, the transcoder 220 can output the media stream 140 as a MPEG2-PS stream, with H.264 video and AAC audio. The transcoder 220 may be a hardware transcoder or a software transcoder, in which case may be executed by the processing device 210. The processing device 210 can configure the transcoder 220 to encode a media content file 242 at a specified bitrate 150 to obtain the media stream 140. The media stream 140 is output to the processing device 210. The server 200 may implement any suitable transcoder 220 and while one transcoder is shown in FIG. 2, the server 200 may include a plurality of transcoders 220.

The stream cache 230 temporarily stores recent portions of the media stream 140. The stream cache 230 may be stored on a dedicated memory device (not shown) or on the memory of the processing device 210. As the stream manager 212 streams the media stream 140, the stream manager 212 stores the streamed portions of the media stream 140 in the stream cache 230. The stream cache 230 allows a client 300 to request continuation of a media stream 140 when, for example, the media stream 140 was somehow interrupted. Each frame of the media stream 140 can be indexed by a byte offset, a frame offset, and/or a time offset, such that when the client 300 requests to continue the media stream 140 at a particular instance, the client 300 can reference the particular instance with a particular byte offset, frame offset, or time offset. The stream cache 230 may be implemented in any suitable manner. For example, the stream cache 230 may be a first-in-first-out cache, such as the stream cache 230 purges the oldest frames first. Moreover, while one stream cache 230 is shown, the stream manager 212 can instantiate stream caches 230 for each open streaming session.

The storage device 240 stores the media content files 242. As previously mentioned the storage device 240 can be implemented on the server 200 and/or at one or more remote computing devices. The storage device 240 can be any suitable non-transitory, non-volatile storage medium, e.g., a hard disk drive, an optical drive, and/or a magnetic drive. In implementations where the storage device 240 is distributed amongst computing devices (which may include the server 200), each media file 242 may be stored at a specific device or may be distributed amongst two or more of the computing devices.

The network interface device 250 performs communication with other remote devices, e.g., client 300, via the network 110. The network interface device 250 can perform wired or wireless communication. Examples of the network interface device 250 include, but are not limited to, a transceiver configured to perform communications using the IEEE 802.11 wireless standard, an Ethernet port, and an optical communications port. While one network interface device 250 is illustrated, the term network interface device 250 can include one or more network interface devices 250.

The stream manager 212 controls the streaming of media streams 140 to clients 300. The stream manager 212 receives the request 120 from the client 300 for a media stream 140. In response, the stream manager 212 can generate a new session, initiate the transcoding of a media content file 242 to a media stream 140, and transmit the media stream to the client 300. The stream manager 212 monitors the client's status based on the received control messages 130, monitors the server state, and determines an adjusted bitrate for the media stream 140 based thereon. As the stream manager 212 adjusts the bitrate 150, the stream manager 212 can monitor the effects of such adjustments to the bitrate 150, and if appropriate, readjust the bitrate 150. For example, if the adjustment in the bitrate causes the buffer to fill, the stream manager 212 can increase the bitrate. Conversely, if the adjustment in the bitrate 150 causes the buffer 322 to deplete, the stream manager 212 can decrease the bitrate 150.

While reference is made to a single client 300, the stream manager 212 controls the streaming of media streams to multiple clients 300. The stream manager 212 receives the media stream 140 from the transcoder 220 and splits the media stream 140 into packets. In some implementations, the stream manager 212 splits the packets with a type-length-value (TLV) encoding. Furthermore, the stream manager 212 can generate the packets according to the transfer encoding specified in the request 120, e.g., HTTP chunked or HTTP chunked-live encoding (which is an extension of HTTP). Once a packet is formatted, the stream manager 212 can transmit the packet via the network to the client 300 and/or can store the packet in the stream cache 230. The stream manager 212 can continue to stream the media stream 140 until the client 300 ends the streaming session or the session is interrupted.

In some implementations, the stream manager 212 is configured to provide heartbeat messages 160 to the client 300 during transmission of the media stream 140. In these implementations, the client 300 may request the heartbeat messages 160 by, for example, requesting the HTTP chunked-live encoding. The stream manager 212 can transmit a heartbeat message 160 to the client with the media stream 140 at predetermined intervals, e.g., every half second. The following is an example of a heartbeat message:

```
1; type=heartbeat\r\n
H\r\n
```

If the client 300 misses a predetermined amount of heartbeat messages 160, e.g., four consecutive heartbeat messages 160, the client 300 can determine that the session has been lost and can request to continue the media stream 140 over a new session. When the buffer 322 of the client 300 is full, the client 300 may stop reading data from a socket while waiting for the buffer 322 to deplete, which may take additional time if the media player 312 is in a pause mode. During such a scenario, the stream manager 212 can pause or suspend transmission of the media stream 140 but can continue to transmit the heartbeat messages 160. It is noted that the foregoing feature can be explicitly turned off by the server 200 and/or at the request of a client 300.

In some implementations, the stream manager 212 can be configured to provide media streams 140 of live feeds, e.g., live television, to clients 300. In such implementations, the stream manager 212 can receive a live feed and can provide the live feed to the transcoder 220 and a bitrate 150 at which to encode the live feed. The stream manager 212 can transmit the media stream 140 corresponding to the live feed to the client 300. As shown in FIG. 2, the live feed is obtained from the network 110 via the network interface device 250. It is noted that the stream manager 212 can receive the live feed in any other suitable manner. For instance, the stream manager 212 can receive the stream via a dedicated receiver, such as an off-the-air antenna or a satellite dish.

In some implementations, the stream manager 212 can create two threads once an incoming connection is detected. A first thread may be a request thread for reading a client's 300 incoming HTTP requests over a keep alive connection. The second thread can be a data thread for reading data from the transcoder 220 and forwarding the data to the client 300. A separate heartbeat thread may be implemented to produce heartbeat messages 160. The heartbeat thread may be synchronized with the data thread so that the threads do not write into the same socket simultaneously. A main thread of the stream manager 212 can act as an event loop. This thread can pick up events from processor threads and feed them into various event listeners. The event listeners can be classes that are responsible for bitrate control, network speed measurements, and client state tracking.

The server 200 of FIG. 2 is provided for example only. The stream manager 212 can be implemented at any suitable computing device so that the computing device may deliver a media stream 140 to another computing device. Furthermore, the description of the components, including the stream manager 212 can be configured to perform additional tasks not explicitly disclosed herein.

Figure 3:
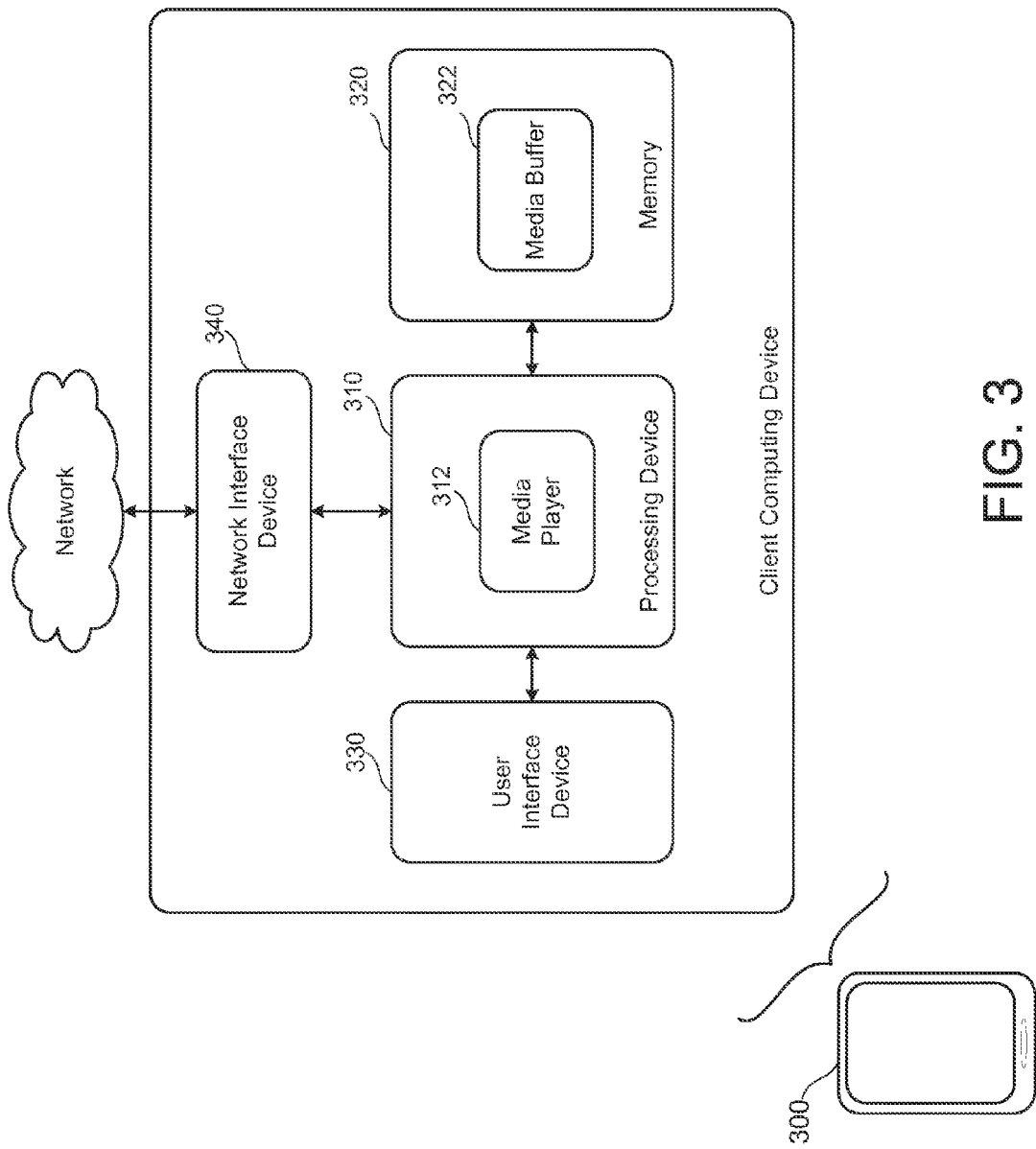
FIG. 3 is a schematic illustrating an example client configured to play a media stream.

FIG. 3 illustrates an example of the client 300. As shown in FIGS. 1 and 3, the client 300 is depicted as a mobile computing device. The client, however, may be any suitable user device, including but not limited to, a television, a personal computer, a laptop computer, a tablet computer, a mobile computing device, a smartphone, a vehicle infotainment system, and a portable gaming device. The client can include a processing device 310, a memory device 320, a user interface device 330, and a network interface device 340. The client 300 can include additional components that are not shown in FIG. 3.

The processing device 310 can include non-transitory computer-readable memory and one or more processors. In implementations where the processing device includes two or more processors, the two or more processors can operate in an individual or distributed manner. The processing device 310 executes a media player 312 embodied as computer-readable instructions.

The memory device 320 can be any suitable volatile or non-volatile non-transitory computer readable memory. In some implementations, the memory device 320 includes RAM. The memory device 320 stores the buffer 322. The buffer 322 stores a portion of the media stream 140. The buffer 322 can provide the buffered portions of the media stream 140 to the media player 140 in a sequential order.

The client 300 also includes one or more user interface devices 330. A user interface device 330 is any device that allows a user to interact with the client 300. Examples of user interface devices 330 can include, but are not limited to, display devices, touchscreens, touchpads, keyboards, speakers, microphones, mice, cameras, and motion sensors.

The network interface device 340 performs communication with other remote devices, e.g., server 200, via the network 110. The network interface device 340 can perform wired or wireless communication. Examples of the network interface device 340 include, but are not limited to, a transceiver configured to perform communications using the IEEE 802.11 wireless standard, one or more transceivers configured to communicate using the second, third, and/or fourth generation of mobile telecommunications technology, and Ethernet port. While one network interface device 340 is illustrated, the term network interface device 340 can include one or more network interface devices 340.

The media player 312 requests a media stream 140 from the server 200. In response, the media player 312 receives the media stream 140 and plays the media stream 140 via one or more user interface devices 330. In some implementations, the media player 312 can include a transcoder (not shown) that decodes the media stream 140 into a playable format. Additionally, or alternatively, the media player 312 may include a demultiplexer to demultiplex the media stream 140. In some implementations, the demutliplexer is a java-based demultiplexer, e.g., Mpeg2TsDemuxer.

To request a media stream 140, the media player 312 generates a request 120 for a media stream 140. As discussed above, the request 120 can include a content selection 122 and a bitrate guidance 124. The bitrate guidance 124 is a value indicating an initial bitrate of the media stream 140. The media player 312 can determine the bitrate guidance 124 based on a number of criteria. For example, in determining the bitrate guidance 124, the media player 312 can consider whether the server 200 is on the same LAN as the client 300, whether the client 300 is in a home location, whether the client 300 is using a Wifi connection or a cellular network, results from network speed tests, and whether the client 300 is running any other applications running on the client and that use network resources. The media player 312 can include the bitrate guidance 124 in the request 120 using the X-Bitrate-Guidance header in the initial HTTP request. This header is processed when the request does not indicate the X-Streaming-SessionID header. If the media player 312 is restoring a previous session, the header is ignored. The media player 312 can receive the content selection 122 from a user via a user interface device 330. The media player 312 can include the content selection 122 in the request 120 using the GET header.

In response to the request 120, the media player 312 begins receiving the media stream 140. The media player 312 receives the media stream 140 as sequential (or substantially sequential) packets containing individual chunks 142 of the media stream 140. As the stream is received, the media player 312 can store the chunks 142 received in the packets in the buffer 322. During playback, the media player 312 can retrieve the frames from the media buffer and output the media content via one or more of the user interface devices 330. As the media player 312 is playing the media stream 140, the media player 312 can keep track of the most recent frame, byte, or time instance of the playback, in the event that the media stream 140 is interrupted.

While operating, the media player 312 monitors its state and the state of the buffer 322. Each time the media player 312 changes states, e.g., switches from a play mode to a pause mode or vice-versa, the media player 312 generates a control message 130. The media player 312 can query the buffer to determine the amount of data currently stored in the buffer 322 and the percentage of the buffer 322 that is full (or empty). The media player 312 can determine other parameters, such as, whether the buffer is filling or depleting. The media player 312 includes its player state 132 and the buffer state 134 in a control message 130 and transmits the control message 130 to the server 200 via the HTTP connection. Furthermore, the media player 312 generates control messages 130 at predetermined time intervals, e.g., every half second. At each time interval, the media player 312 can report the player state 132 and the buffer state 134 in a control message 130 and transmit the control message 130 to the server 200.

The media player 312 may be further configured to monitor the session with the server 200, such that if the session is interrupted for a prolonged period of time, the media player 312 requests anew session from the server 200. In some implementations, the media player 312 monitors the HTTP connection for heartbeat messages 160. In these implementations, if the media player 312 does not receive a heartbeat message 160 for a predetermined amount time, e.g., two seconds, the media player 312 determines that the HTTP connection has likely went stale. The media player 312 can then request a news session while continuing the media stream 140 at the last received or played frame, byte, or time instance of the media stream 140.

According to some implementations, the following threads may be executed to play a media stream 140:

1. A protocol reader thread reads the incoming media stream 140 from the socket and stores the media stream 140 in the buffer 322.

2. A player pusher thread takes the media stream 140 from the buffer 322 and pushes it into media player 312.

3. An audio reader thread reads audio data of the media stream 140 from an audio codec and schedules a frame presentation task.

4. A video reader thread reads video data of the media stream 140 from a video codec and schedules a frame presentation task.

5. An audio presentation thread picks up audio frames from a frame queue and sends the audio frames for playback at an appropriate time.

6. A video presentation thread picks up video frames from a frame queue and sends the video frames for playback at appropriate time.

Additional threads may be needed to periodically send buffer status and monitor server's heartbeat. In some implementations, asynchronous sockets may be used to eliminate the need for some of the threads.

Figure 4:
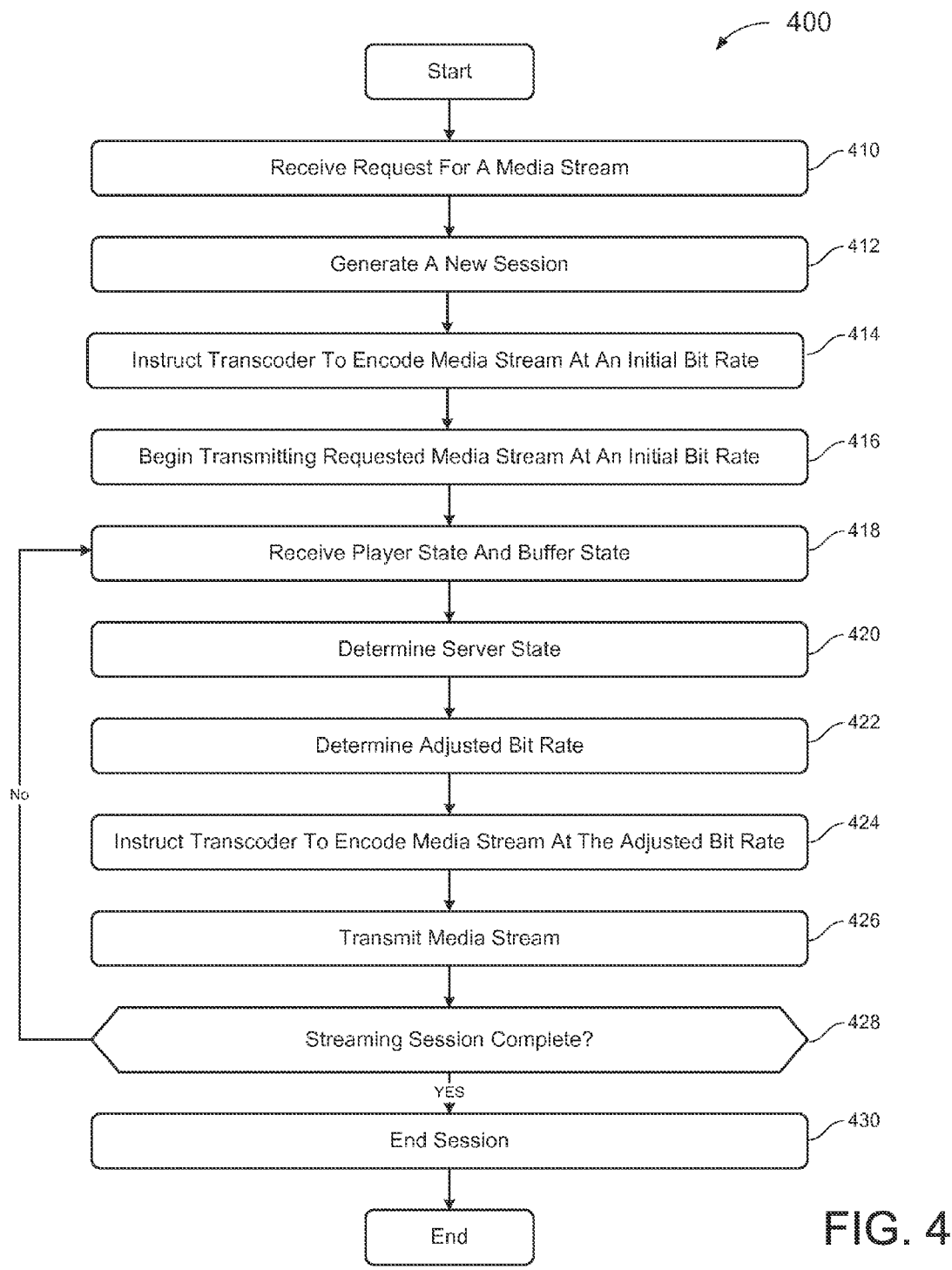
FIG. 4 is a flow chart illustrating an example set of operations of a method for providing a media stream to a client from a server.

FIG. 4 illustrates an example set of operations for a method 400 of providing a media stream 140 to a client device 300 from a server 200. For purposes of explanation, the method 400 is explained with reference to the client device 300 and server 200 of FIGS. 1-3.

At operation 410 the stream manager 212 receives a request 120 for a media stream 140. The request 120 includes a content selection 122 and a bitrate guidance 124. The request 120 can further include additional information, such as a requested encoding, e.g., chunked or chunked-live, and a session ID (to the extent a session has already been created by the server).

At operation 412 the stream manager 212 generates a new session. In some implementations, the new session is anew HTTP connection. The stream manager 212 can also assign a session ID to the new session. For example, the session ID may be a string of characters in Base64 set of unrestricted length. The session ID should uniquely identify the streaming session.

At operation 414 the stream manager 212 instructs the transcoder 220 to encode the media stream at an initial bitrate 150. The stream manager 212 may retrieve the media file 242 to be encoded from the storage device 240 (or a portion thereof) and may provide the media file 242 to the transcoder 220. The transcoder 220 outputs the media stream 140 encoded at the initial bitrate 150.

Figure 5:
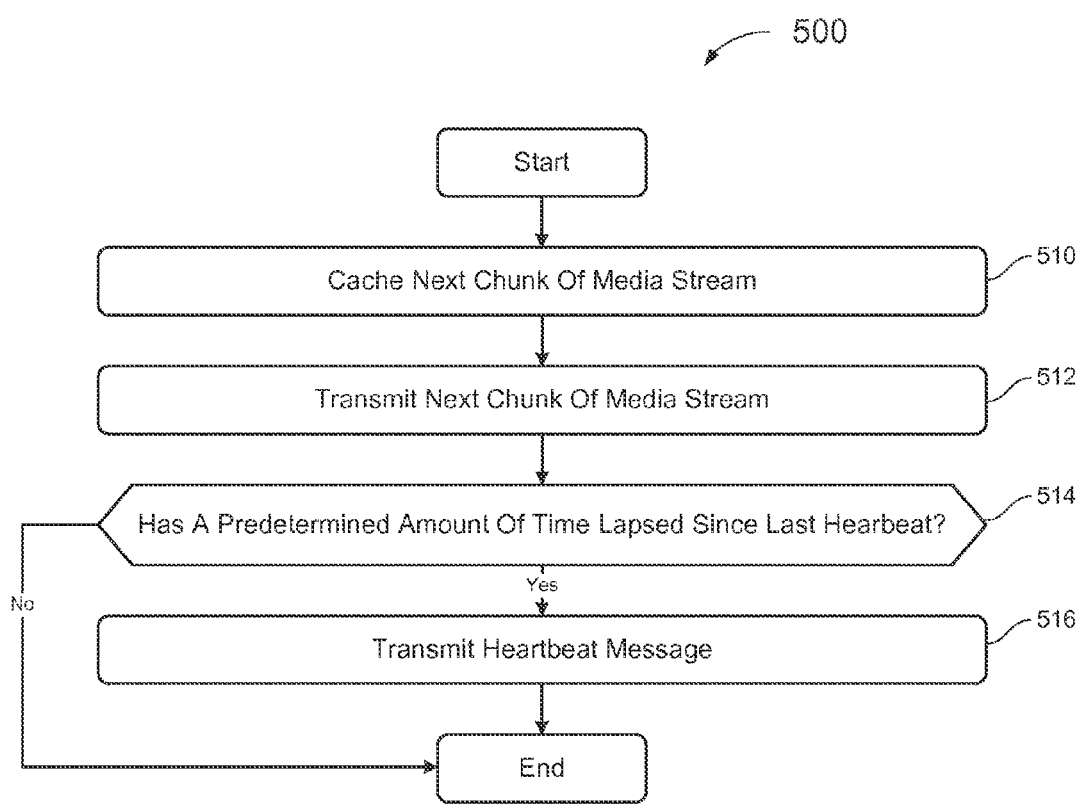
FIG. 5 is a flow chart illustrating an example set of operations for transmitting a media stream.

At operation 416 the stream manager 214 transmits the media stream 140 to the client 300 over the HTTP connection. In some implementations, the stream manager 214 transmits the media stream 140 as a series of sequential chunks 142 thereof. FIG. 5 illustrates an example set of operations for a method 500 for transmitting a chunk 142 of data (e.g., the media stream 140). At operation 510, the stream manager 212 caches a next data chunk 142 in the cache 230. The next data chunk 142 is the data that is sequentially next to be streamed to the client 300. For each data chunk 142, the media stream 140 can index the chunk 142 by storing a flume offset, a byte offset, or a time offset of the chunk 142. At operation 512, the stream manager 212 transmits the next chunk 142 of data of data to the client 300 over the HTTP connection. To transmit the chunk 142 of data, the stream manager 214 can packetize the chunk 142 according to various protocols and the selected transfer encoding. The stream manager 212 sends the packets to the client 300 over the HTTP connection. As mentioned, in some implementations, the client 300 can request heartbeat messages 160. Thus, at operation 514, the stream manager 212 determines whether a predetermined amount of time has passed since the last heartbeat message 160, e.g., more than half a second. If so, the stream manager 212 transmits a new heartbeat message 160 to the client 300, as shown at operation 516. The stream manager 212 can continue to transmit chunks 142 of data in this manner.

Referring back to FIG. 4, at operation 418 the stream manager 212 receives a control message 130 from the client 300, which includes the buffer state 134 and the player state 132 of the client 300. At operation 420 the stream manager 212 determines its server state. The stream manager 212 can determine its state either by performing analytical tests and/or observing operation of the transcoder 220 and the network 110 white streaming. As previously mentioned, the stream manager 212 can monitor the amount of time waiting for the transcoder 220 for a kB of data, $T_t$, the amount of time waiting to send a kB of data over the network 110, $T_n$, and/or the speed of the network 110, $R_n$.

Figure 6:
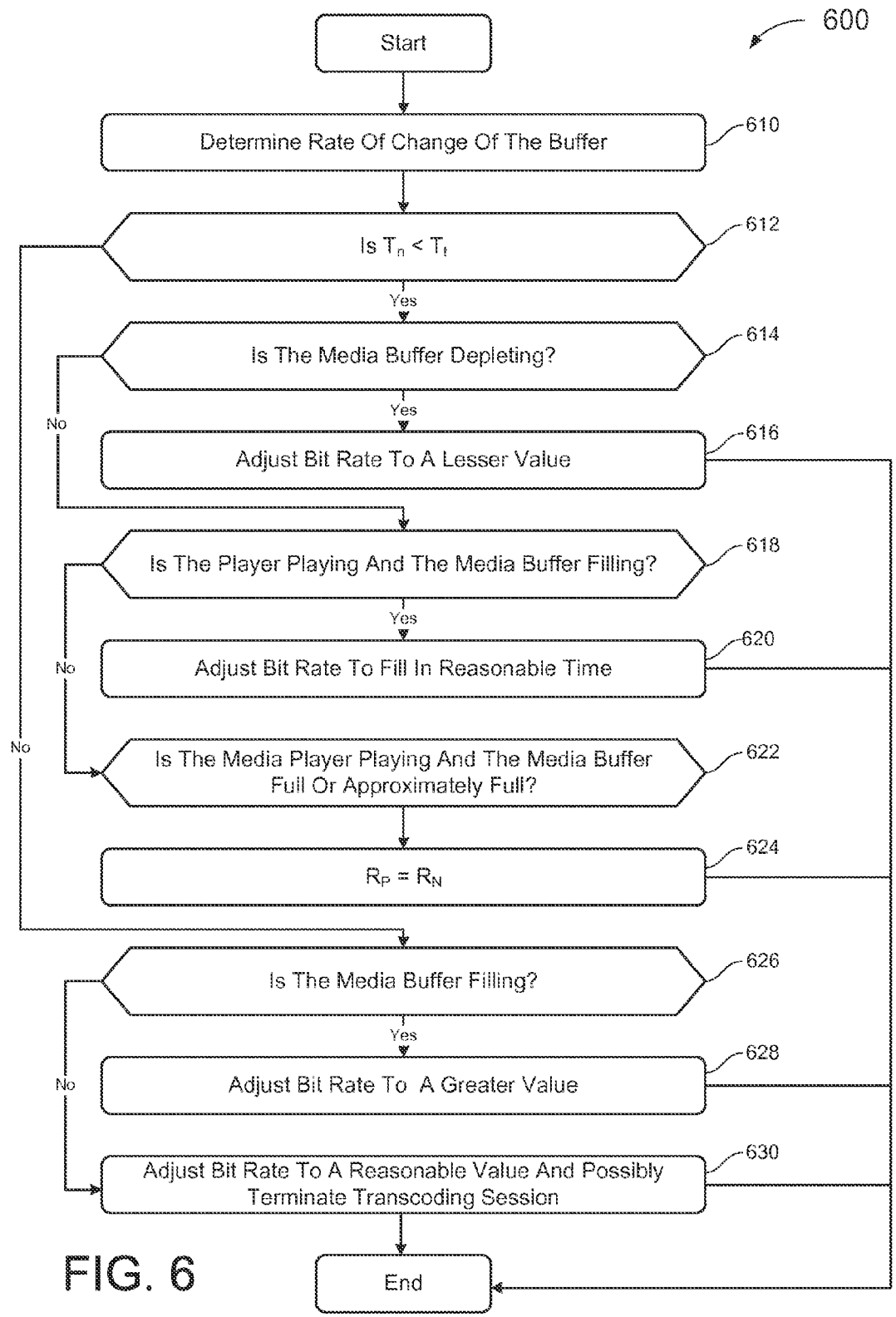
FIG. 6 is a flow chart illustrating an example set of operations of a method for determining an adjusted bitrate of a media stream.

At operation 422 the stream manager 212 determines an adjusted bitrate 150 for the media stream 140. The stream manager 212 can determine the adjusted bitrate 150 based on the buffer state 134, the player state 132, and the server state. FIG. 6 illustrates an example set of operations for a method for determining an adjusted bitrate 150.

At operation 610 the stream manager 212 determines the rate of change of the buffer 322, $D'(t)$. $D'(t)$ does not need to be determined with a high degree of accuracy; rather, the stream manager 212 can look to previous control messages to determine how much data was stored in the buffer 322 at the previous few messages (e.g., previous two or three). Knowing the previous amounts of data and the amount of time between control messages, the stream manager 212 can determine $D'(t)$ and can determine whether $D'(t)$ is greater than zero (i.e., the buffer 322 is filling), less than zero (i.e., the buffer 322 is depleting) or equal to zero (i.e., the buffer 322 is not depleting and/or the rate of playing equals the rate of filling).

At operation 612, the stream manager 212 determines whether the speed of the network, $T_n$, is greater than the speed of the transcoder 220, $T_t$. If so, the stream manager 212 determines whether the buffer 322 is depleting, as shown at operation 614. If the buffer 322 is depleting, the stream manager 212 adjusts the bitrate 150 to a lesser value. The stream manager 212 can make predetermined adjustments, e.g., select the next lowest available bitrate 150, or can calculate a new bitrate 150, e.g., reduce the bit value by 25%. By decreasing the bitrate 150, the time length of the buffer 322 increases relatively. If the buffer 322 is not depleting, the stream manager 212 determines whether the media player 312 is playing the media stream 140 and the buffer 322 is filling. If the buffer 322 is filling and the media player 312 is playing the media stream 140, the stream manager 212 adjusts the bitrate 150 to fill the buffer 322 in a reasonable amount of time. In some implementations, the stream manager 212 determines the bitrate 150 according to:

$$R_p = R_n - \text{BufferSize}/\text{TimeToFill}$$

where Rn is the rate of the network, Rp is the bitrate, BufferSize is the size of the buffer, and TimeToFill is the amount of time to fill the buffer. TimeToFill can be selected based on a number of factors, including the size of the buffer, the type of media being streamed, and/or any other suitable considerations.

If the media player 312 is not playing and/or the buffer 322 is not depleting, the stream manger 212 determines whether the buffer 322 is full or approximately full, e.g., eater than 95% full. If so, the stream manager 212 sets the bitrate 150 equal, or approximately equal, to the speed of the network 110, $R_n$. Upon setting the bitrate 150 equal to the speed of the network 110, the stream manager 212 can make a series of adjustments to the bitrate 150 to determine a bitrate 150 at which the client's 300 buffer 322 is steady, beginning with the last known network speed. In some implementations, the stream manager 212 can compute the network speed from the buffer state 134, and check for discrepancies between the apparent outgoing rate and the incoming rate at the client 300. Such discrepancies are possible, for example, when the client 300 cannot keep in pace with the media stream 140 and the media player 312 starts to consume slower than real time, even though the stream manager 212 is serving the media stream 140 at an appropriate bitrate 150.

If at operation 612 the stream manager 212 determines that the transcoder 220 speed is greater than the network speed, the stream manager 212 determines whether the media buffer 322 is filling, as shown at operation 626. If so, the stream manager 212 increases the bitrate 150, as shown at operation 628. The steam manager 212 can iteratively increase the bitrate until the buffer 322 stabilizes. If the media buffer 322 is depleting, the stream manager 212 can adjust the bitrate 150 to a reasonable value. The stream manager 212 can attempt to reduce the bitrate 150 iteratively until the buffer 322 stabilizes. If the buffer 322 does not stabilize, the stream manager 212 can terminate the transcoding session.

Referring back to FIG. 4, each time the stream manager 212 determines to adjust the bitrate 150, the stream manager 212 instructs the transcoder 220 to encode the media stream 140 at the adjusted bitrate 150, as shown at operation 424. As the transcoder 220 outputs the media stream 140, the stream manager 212 transmits the media stream 140 to the client 300 as shown at operation 426. As was discussed with respect to operation 416, the stream manager 212 can read the transcoded media stream 140 from the transcoder 220 and can provide the transcoded media stream 140 to the client 300.

At operation 428, the stream manager 2112 determines whether the session is complete. The session may be complete when the client 300 terminates the session, when the media content file 242 is completely transcoded and transmitted, or if the stream manager 212 decides to terminate the session. If the streaming session is complete, the stream manager 212 ends the streaming session, as shown at operation 430. Otherwise, the stream manager 212 continues to operate.

The methods of FIGS. 4-6 are provided for example only. Variations of the methods are within the scope of the disclosure. The orderings of the operations are not mandatory as some operations may be performed out of the order shown in the FIGS. 4-6. Furthermore, some operations may be performed in parallel and may be executed in different threads.

Figure 7:
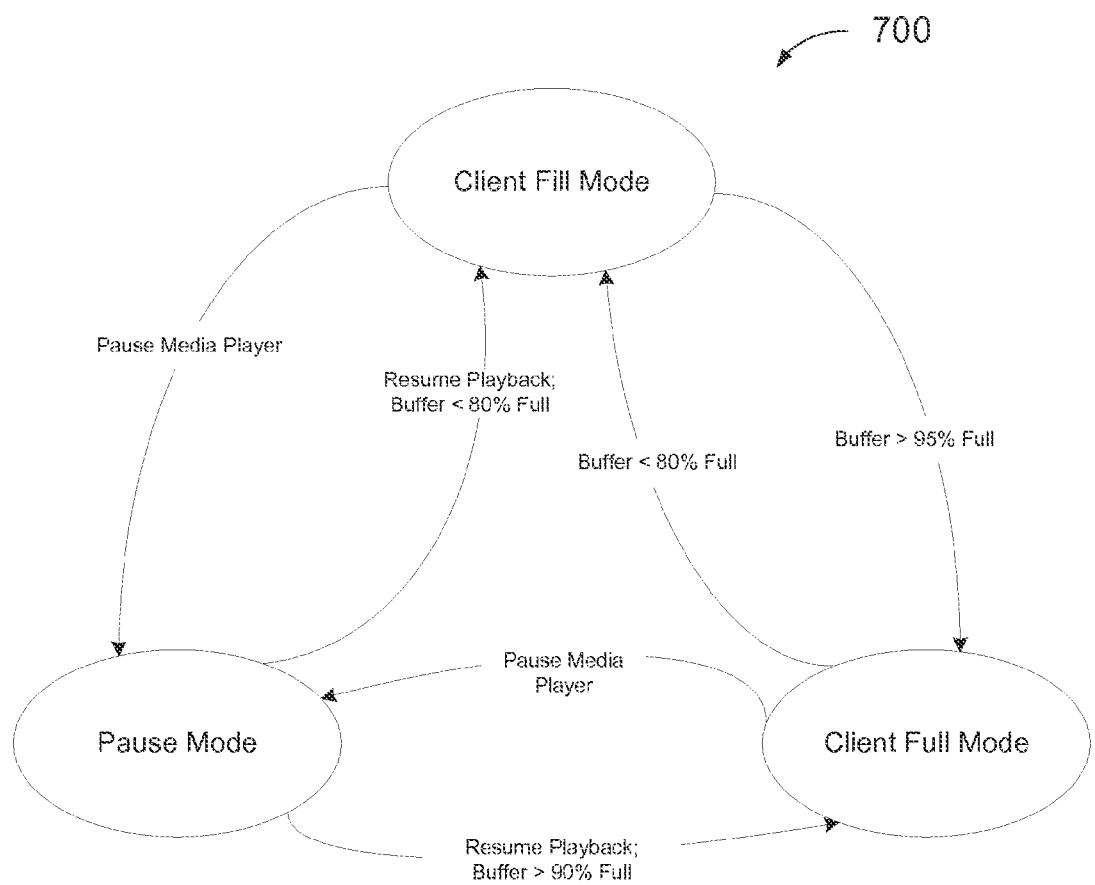
FIG. 7 is a schematic illustrating an example state diagram of a server based on the state of a client.

Referring now to FIG. 7, an example state diagram 700 illustrating client state transitions from the server 200 side is illustrated. Initially, the server 200 enters a "client fill mode," whereby the server 200 transmits the media stream 140 to the client 300. If the client 300 enters a pause mode, then the server 200 enters a "pause mode" as well. In the pause mode, the server 200 may pause delivery of the media stream. When the client 300 resumes playback of the media stream 140, the server 200 enters the client fill mode if the buffer state 134 indicates that the buffer 322 is less than a first threshold, e.g., 80%. When the client 300 resumes playback of the media stream 140, the server 200 enters a "client full mode" when the buffer state 134 indicates that the buffer 322 is greater than a second threshold, e.g., 95%. Otherwise, the server 200 can remain in the pause mode until the buffer 322 is depleted below the first threshold. When the server 200 is in client fill mode and the buffer state 134 indicates that the buffer 322 has exceeded the second threshold, the server 200 enters the client full mode. The server 200 remains in the client full mode, until the client enters a pause mode or until the buffer state 134 indicates that the buffer 322 is below the first threshold. In the later scenario, the server 200 reenters the client fill mode.

The state diagram 700 is provided for example only. The values that rigger switching modes are provided for explanatory purposes and not intended to limit the operation of the server 200.

When the server 200 is delivering a live media stream 140, e.g., a live television feed, there are additional considerations that can be taken into account. For example, the data flow may be limited by the transcoder capacity, and the stream manager 212 should aim to keep the client's buffer stable. In this case, the client's buffer 322 should not be left fully deplete. Thus, the stream manager 212 can adjust the bitrate 150 down when the network speed starts to approach the transcoder speed. Furthermore, in the case of live media streaming, another consideration is the amount of time that is allowed for the filling of the buffer 322. Any data that is stored in the buffer 322 is a result of a delayed playback, due to the inherent properties of live media streams. Thus, the buffer 322 cannot be replenished without stopping playback of the media stream 140. Thus, the bitrate 150 should be chosen as a balance between user experience and stability of the playback.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method for serving a media stream to a client device, the method comprising:
    transmitting a media stream encoded at a first bitrate to a client device;
    receiving a control message from the client device each time a media player of the client device changes from operating in one of a play mode or a pause mode to operating in the other one of the play mode or the pause mode, the control message indicating a player state of the media player at a time corresponding to the control message and a buffer state of a buffer of the client device at the time;
    determining a server state of a server, the server state at least indicating a network bandwidth available to the server;
    determining a second bitrate for the media stream based on the player state, the buffer state, and the network bandwidth available to the server;
    instructing a transcoder to encode the media content at the second bitrate to obtain an adjusted media stream;
    transmitting the adjusted media stream to the client device;
    pausing transmission of the adjusted media stream to the client device when the media player changes from operating in the play mode to operating in the pause mode; and
    when the media player resumes to operating in the play mode:
        when a proportion of the buffer that is full is less than a first threshold:
            adjusting the second bitrate to fill the buffer according to:

$$R_p = R_n - \text{BufferSize}/\text{TimeToFill}$$

where Rn is the bandwidth of the network, Rp is the second bitrate, BufferSize is the size of the buffer, and TimeToFill is an amount of time to fill the buffer; and
            transmitting the media stream to the client device at the adjusted second bitrate;
        when the proportion of the buffer that is full is greater than the first threshold and less than a second threshold:
            pausing transmission of the media stream to the client device until the proportion of the buffer that is full decreases to a value less than the first threshold; and
            when the buffer is depleting, adjusting the second bitrate such that the adjusted second bitrate is less than the first bitrate;
        when the proportion of the buffer that is full is greater than the second threshold:
            adjusting the second bitrate to be approximately equal to the network bandwidth; and
            transmitting the media stream to the client device at the adjusted second bitrate until the media player changes to operating in the pause mode or until the proportion of the buffer that is full is less than the first threshold.

2. The method of claim 1, wherein the player state indicates whether the media player is operating in the play mode or the pause mode and the buffer state indicates i) an amount of media content stored in the buffer at the time and ii) a value indicating the proportion of the buffer that is full or empty at the time.

3. The method of claim 2, further comprising:
    determining whether the media buffer is full or approximately full; and
    when the media buffer is full or approximately full, adjusting the second bitrate to be approximately equal to the network bandwidth.

4. The method of claim 2, further comprising:
    determining whether the network bandwidth is greater than a speed of the transcoder and whether the media buffer is filling; and
    when the network bandwidth is greater than the speed of the transcoder and when the media buffer is filling, adjusting the second bitrate such that the second bitrate is greater than the first bitrate.

5. The method of claim 2, further comprising:
    determining whether the network bandwidth is greater than a speed of the transcoder, whether the media player is playing, and whether the media buffer is filling;
    when the network bandwidth is greater than the speed of the transcoder and when the media buffer is filling, adjusting the second bitrate such that the second bitrate is greater than the first bitrate;
    when the network bandwidth is less than the speed of the transcoder and the media buffer is full or approximately full, setting the second bitrate approximately equal to the network bandwidth;
    when the network bandwidth is less than the speed of the transcoder and the buffer is depleting, adjusting the second bitrate such that the second bitrate is less than the first bitrate; and when the network bandwidth is less than the speed of the transcoder, media player is playing, and the media buffer is filling, adjusting the second bitrate according to:

$$R_p = R_n - \text{BufferSize/TimeToFill}$$

where Rn is the bandwidth of the network, Rp is the second bitrate, BufferSize is the size of the buffer, and TimeToFill is an amount of time to fill the buffer.

6. The method of claim 1, further comprising communicating a heartbeat message to the client device at a predetermined interval, the client device using the heartbeat message to ensure that a session between the server and the client device remains operable.

7. The method of claim 1, further comprising storing a portion of the media stream in a cache, the portion of the media stream corresponding to a portion of the media stream being sent to the client device.

8. The method of claim 1, wherein determining the second bitrate is performed by the server.

9. A server for serving a media stream to a client device, the server comprising:
 a transcoder operable to encode a media content file from a first format to a second format at a plurality of different bitrates;
 a network interface device operable to transmit a media stream encoded at a first bitrate to a client device over a network;
 a processing device executing a stream manager;
 wherein the stream manager is configured to:
  receive a control message from the client device each time a media player of the client device changes from operating in one of a play mode or a pause mode to operating in the other one of the play mode or the pause mode, the control message indicating a player state of the media player of the client device at a time corresponding to the control message and a buffer state of a buffer of the client device at the time;
  determine a server state of the server, the server state at least indicating a network bandwidth available to the server;
  determine a second bitrate for the media stream based on the player state, the buffer state, and the network bandwidth available to the server;
  instruct the transcoder to encode the media content at the second bitrate to obtain an adjusted media stream;
  transmit the adjusted media stream to the client device via the network interface device;
  pause transmission of the adjusted media stream to the client device when the media player changes from operating in the play mode to operating in the pause mode; and
  when the media player resumes to operating in the play mode:
   when a proportion of the buffer that is full is less than a first threshold:
    adjust the second bitrate to fill the buffer according to:

$$R_p = R_n - \text{BufferSize/TimeToFill}$$

where Rn is the bandwidth of the network, Rp is the second bitrate, BufferSize is the size of the buffer, and TimeToFill is an amount of time to fill the buffer; and
    transmit the media stream to the client device at the adjusted second bitrate;
   when the proportion of the buffer that is full is greater than the first threshold and less than a second threshold:
    pause transmission of the media stream to the client device until the proportion of the buffer that is full decreases to a value less than the first threshold; and
    when the buffer is depleting, adjust the second bitrate such that the adjusted second bitrate is less than the first bitrate;
   when the proportion of the buffer that is full is greater than the second threshold:
    adjust the second bitrate to be approximately equal to the network bandwidth; and
    transmit the media stream to the client device at the adjusted second bitrate until the media player changes to operating in the pause mode or until the proportion of the buffer that is full is less than the first threshold.

10. The server of claim 9, wherein the player state indicates whether the media player is operating in the play mode or the pause mode and the buffer state indicates i) an amount of media content stored in the buffer at the time and ii) a value indicating the proportion of the buffer that is full or empty at the time.

11. The server of claim 10, wherein the stream manager is further configured to:
 determine whether the media buffer is full or approximately full; and
 when the media buffer is full or approximately full, adjust the second bitrate to be approximately equal to the network bandwidth.

12. The server of claim 10, wherein the stream manager is further configured to:
 determine whether the network bandwidth is greater than a speed of the transcoder and whether the media buffer is filling; and
 when the network bandwidth is greater than the speed of the transcoder and when the media buffer is filling, adjust the second bitrate such that the second bitrate is greater than the first bitrate.

13. The server of claim 10, wherein the stream manager is further configured to:
 determine whether the network bandwidth is greater than a speed of the transcoder, whether the media player is playing, and whether the media buffer is filling;
 when the network bandwidth is greater than the speed of the transcoder and when the media buffer is filling, adjust the second bitrate such that the second bitrate is greater than the first bitrate;
 when the network bandwidth is less than the speed of the transcoder and the media buffer is full or approximately full, adjust the second bitrate approximately equal to the network bandwidth;
 when the network bandwidth is less than the speed of the transcoder and the buffer is depleting, adjust the second bitrate such that the second bitrate is less than the first bitrate; and
 when the network bandwidth is less than the speed of the transcoder, media player is playing, and the media buffer is filling, adjust the second bitrate according to:

$$R_p = R_n - \text{BufferSize/TimeToFill}$$

where Rn is the bandwidth of the network, Rp is the second bitrate, BufferSize is the size of the buffer, and TimeToFill is an amount of time to fill the buffer.

14. The server of claim 9, wherein the stream manager is further configured to communicate a heartbeat message to the client device at a predetermined interval, the client device using the heartbeat message to ensure that a session between the server and the client device remains operable.

15. The server of claim 9, further comprising a stream cache that stores a portion of the media stream in a cache, the portion of the media stream corresponding to a portion of the media stream being sent to the client device.

16. The server of claim 9, further comprising a storage device storing a plurality of media content files, including the media content file.

\* \* \* \* \*